: US 8,308,413 B2
(45) Date of Patent: Nov. 13, 2012

(54) SOD ROLL DISPENSER (76) Inventor: Anthony Ford, New Smyrna Beach, FL (US)

( * ) Notice: Subject to any disclaimer, the term of this patent is extended or adjusted under 35 U.S.C. 154(b) by 389 days.

(21) Appl. No.: 12/586,888

(22) Filed: Sep. 29, 2009

(65) Prior Publication Data

US 2011/0073701 A1 Mar. 31, 2011

(51) Int. Cl.
- *A01G 13/02* (2006.01)
- *E01C 23/03* (2006.01)
- *E01C 23/00* (2006.01)
- *E01C 19/52* (2006.01)
- *E01C 19/00* (2006.01)

(52) U.S. Cl. ....... 414/24.6; 242/403; 242/557; 242/919; 242/596.7; 414/910; 414/911; 294/67.22

(58) Field of Classification Search .......... 242/403, 242/533, 557, 596.1, 596.7, 596.8, 598, 919; 294/67.1, 67.22, 67.3, 67.32; 414/27, 532, 414/618, 619, 621, 626, 633, 663, 667, 684, 414/705, 741, 744.2, 908, 911, 920, 664, 414/685, 731, 735, 739, 743, 910; 83/924; 212/242, 259

See application file for complete search history.

(56) References Cited

U.S. PATENT DOCUMENTS

| | | | | |
|---|---|---|---|---|
| 1,951,088 A | * | 3/1934 | Lynch et al. | 212/77 |
| 3,786,948 A | * | 1/1974 | Golden | 414/684 |
| 3,958,772 A | * | 5/1976 | Hynson | 414/24.6 |
| 3,963,130 A | * | 6/1976 | Maynard | 414/684 |
| 4,327,617 A | * | 5/1982 | Budzich et al. | 83/419 |
| 4,354,556 A | | 10/1982 | Evans | |
| 4,576,542 A | * | 3/1986 | Brasell et al. | 414/626 |
| 4,648,769 A | | 3/1987 | Stirling | |
| 4,886,409 A | | 12/1989 | Penner | |
| 5,026,238 A | | 6/1991 | Walt | |
| 5,096,357 A | * | 3/1992 | Galbani | 414/331.11 |
| 5,136,859 A | * | 8/1992 | Nitta | 66/151 |
| 5,437,528 A | | 8/1995 | Decker | |
| 5,490,756 A | * | 2/1996 | Reichert et al. | 414/619 |
| 5,697,452 A | | 12/1997 | Link | |
| 6,131,668 A | | 10/2000 | Houska | |
| 6,213,218 B1 | | 4/2001 | Miller | |
| 6,550,406 B2 | | 4/2003 | Bass et al. | |

* cited by examiner

*Primary Examiner* — Gregory Adams (74) *Attorney, Agent, or Firm* — J. Wiley Horton; Adrienne C. Love (57) ABSTRACT

A roller for moving, rolling and unrolling rolls of sod. The roller is generally comprised of a top portion including a side shift actuator and at least one attachment member for attachment to a vehicle, preferably a skid steer. The roller also includes a rotary actuator with a shaft, slidably attached to the top portion. A main frame consisting of a top member, side member, base member and an end gate, extends down from the shaft of the rotary actuator. The end gate of the main frame is configured to pivot open and closed. The main frame is configured to rotate with the shaft.

13 Claims, 13 Drawing Sheets

SOD ROLL DISPENSER

BACKGROUND OF THE INVENTION

1. Field of the Invention

This invention relates to the field of agriculture. More specifically, the invention comprises a device for lifting, transporting and unrolling rolls of sod.

2. Description of the Related Art

Rolls of sod are often difficult to handle due to their weight and the fact that they must be unrolled precisely so that the unrolled sod covers the ground completely without gaps. Unrolling rolls of sod requires the user to load, unload, move and unroll the sod rolls. Sod rolls can weigh a ton or more and are difficult to handle due to the fact that they are round and can roll away on a slope.

Currently, sod rollers are used to unroll cylinders of sod which contain a central void. A current sod roller, typically mounted to the front of a skid-steer, has two arms which can grasp each side of the central void. A roll of sod is typically only unrolled in one direction. Therefore if the roll of sod is picked up such that unrolling the sod would mean that the skid-steer would have to be driven backwards the user must place the sod back on the ground and pick the roll up again from the opposite side. Current sod rollers are unable to rotate and fully secure rolls of sod.

Rolls of sod are transported on a truck such that the center of each roll is accessible from the side of the truck. Currently, in order to unload the truck the round bales or sod rolls must be manually or mechanically removed from the truck and placed on the ground prior to picking the sod rolls up again with a sod roller.

Therefore what is needed is a roller which can easily and quickly pick up, secure, shift, rotate and unroll a roll of sod, or another cylindrical roll such as a round bale of hay. The present invention achieves this objective, as well as others that are explained in the following description.

BRIEF SUMMARY OF THE INVENTION

The present invention comprises a roller for moving, rolling and unrolling rolls of sod. The roller is generally comprised of a top portion including a side shift actuator and at least one attachment member for attachment to a vehicle, preferably a skid steer. The roller also includes a rotary actuator, slidably attached to the top portion. A main frame consisting of a top member, side member, base member and an end gate, extends down from the shaft of the rotary actuator. The end gate of the main frame is configured to pivot open to accept a sod roll. The main frame is configured to rotate at the shaft.

By allowing for the main frame to rotate with the shaft the user can maneuver the base member into a central void of the roll of sod or in the direction in which the user would like to unroll the sod. Additionally, the latching mechanism of the main frame allows for the rolls of sod to be fully enclosed and secure within the main frame.

REFERENCE NUMERALS IN THE DRAWINGS

| 10 | sod roll dispenser | 12 | end gate |
| 14 | attachment member | 16 | rotary actuator |
| 18 | side shift actuator | 20 | transport vehicle |
| 22 | side member | 24 | top member |
| 26 | base member | 28 | vehicle |
| 30 | top portion | 32 | main frame |
| 34 | motor portion | 36 | bearings |
| 38 | outer connector | 40 | rails |
| 42 | end gate actuator | 44 | end gate latch |
| 46 | shaft | 48 | connector |
| 50 | fastener | 52 | central hub |
| 54 | side shift connector | 56 | roll of sod |
| 58 | central void | 60 | arms |
| 62 | hinge | 64 | bearing housing |
| 65 | arm | | |

DETAILED DESCRIPTION OF THE INVENTION

Figure 1:
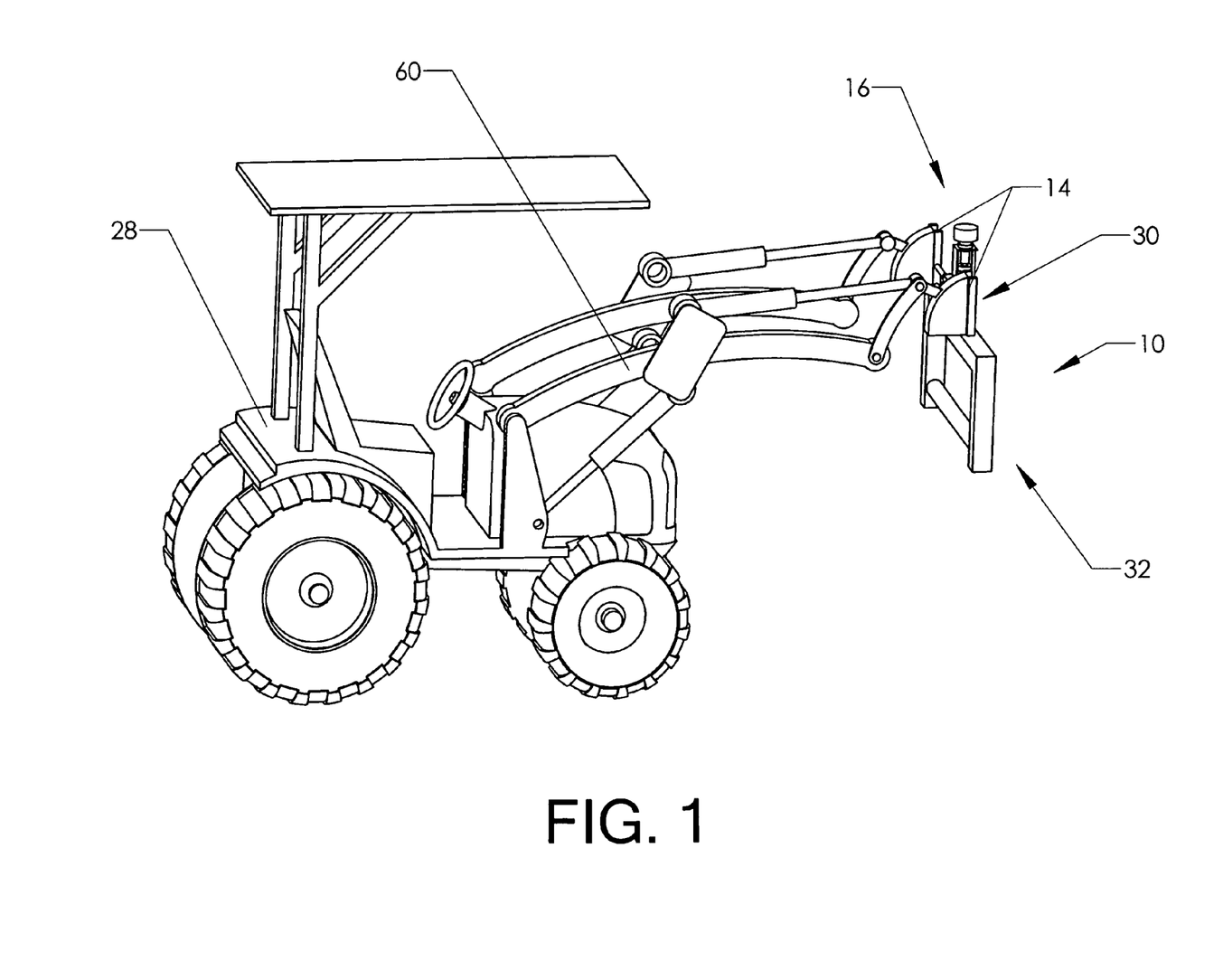
FIG. 1 is a perspective view, showing the present invention attached to a vehicle.

FIG. 1 illustrates the present invention in the preferred embodiment, attached to a vehicle 28. The present invention is preferably attached to a tractor or skid steer such that front arms 60 enable the full operation of the present sod roll dispenser 10.

Sod roll dispenser 10 has the ability to attach and detach from arms 60 of vehicle 28 and can be fully controlled by using the arms 60 of vehicle 28. The specific manner in which vehicle 28 would attach to the sod roll dispenser 10 in order to power, maneuver and operate the sod roll dispenser 10 is known to one skilled in the art.

Figure 2:
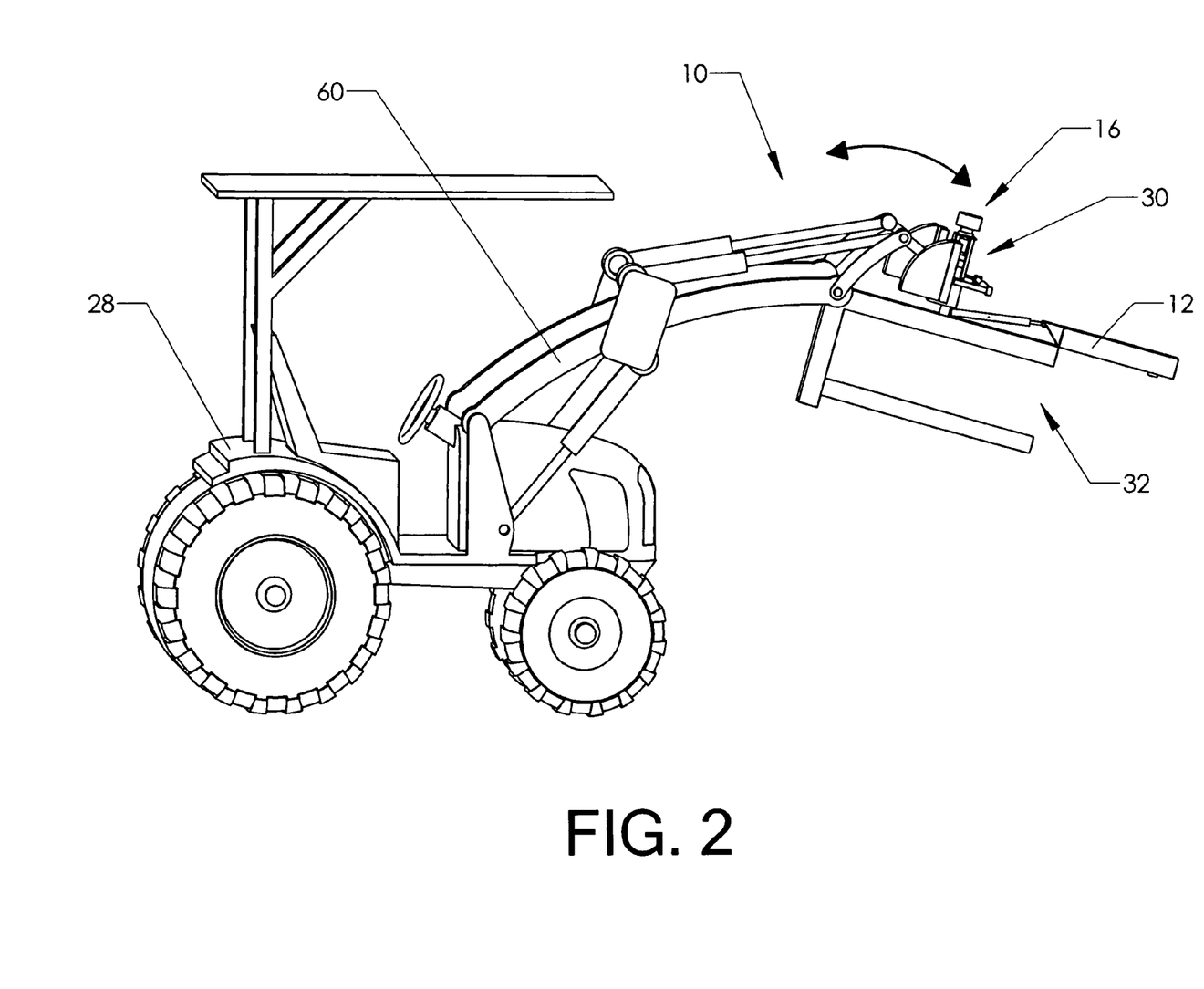
FIG. 2 is a perspective view, showing the present invention attached to a vehicle.

As shown in FIG. 2, sod roll dispenser 10 can be rolled up or down by utilizing arms 60 of vehicle 28 (arrows illustrate the rolling function). The rolling function allows the user to pitch the entire sod roll dispenser 10 up or down in order to better load, unload or maneuver a sod roll. End gate 12 of main frame 32 in FIG. 2 is shown in an open position.

Figure 3:
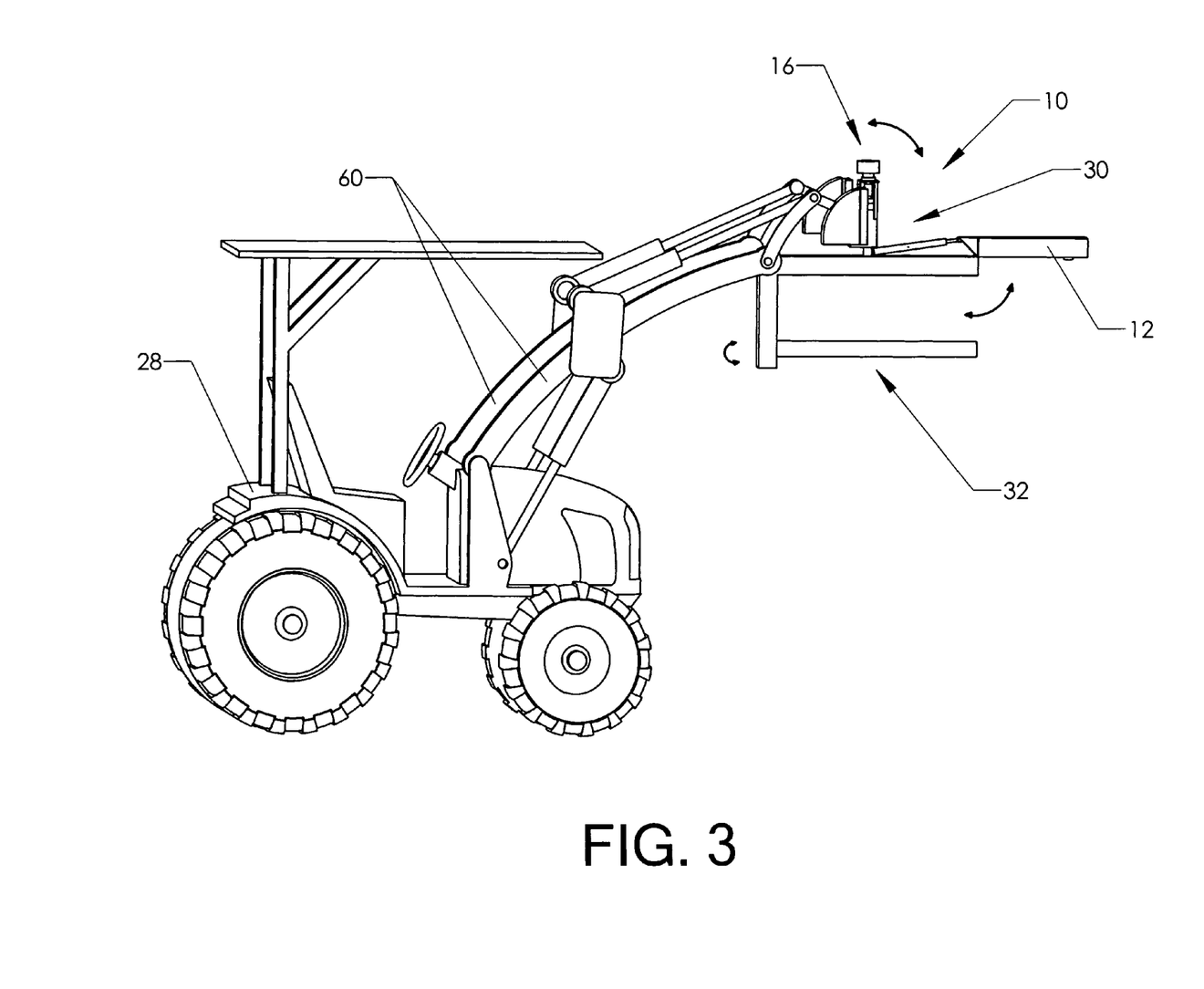
FIG. 3 is a perspective view, showing the present invention attached to a vehicle.

As illustrated in FIG. 3 main frame 32 of sod roll dispenser 10 can rotate. Rotary actuator 16 controls rotation of main frame 32, as discussed in further detail below. In the present illustration main frame 32 is rotated 90 degrees in order to prepare to accept a sod roll 16 (not shown). Arms 60 of vehicle 28, are attached to top portion 30 of sod roll dispenser 10 at attachment members 14.

Figure 4:
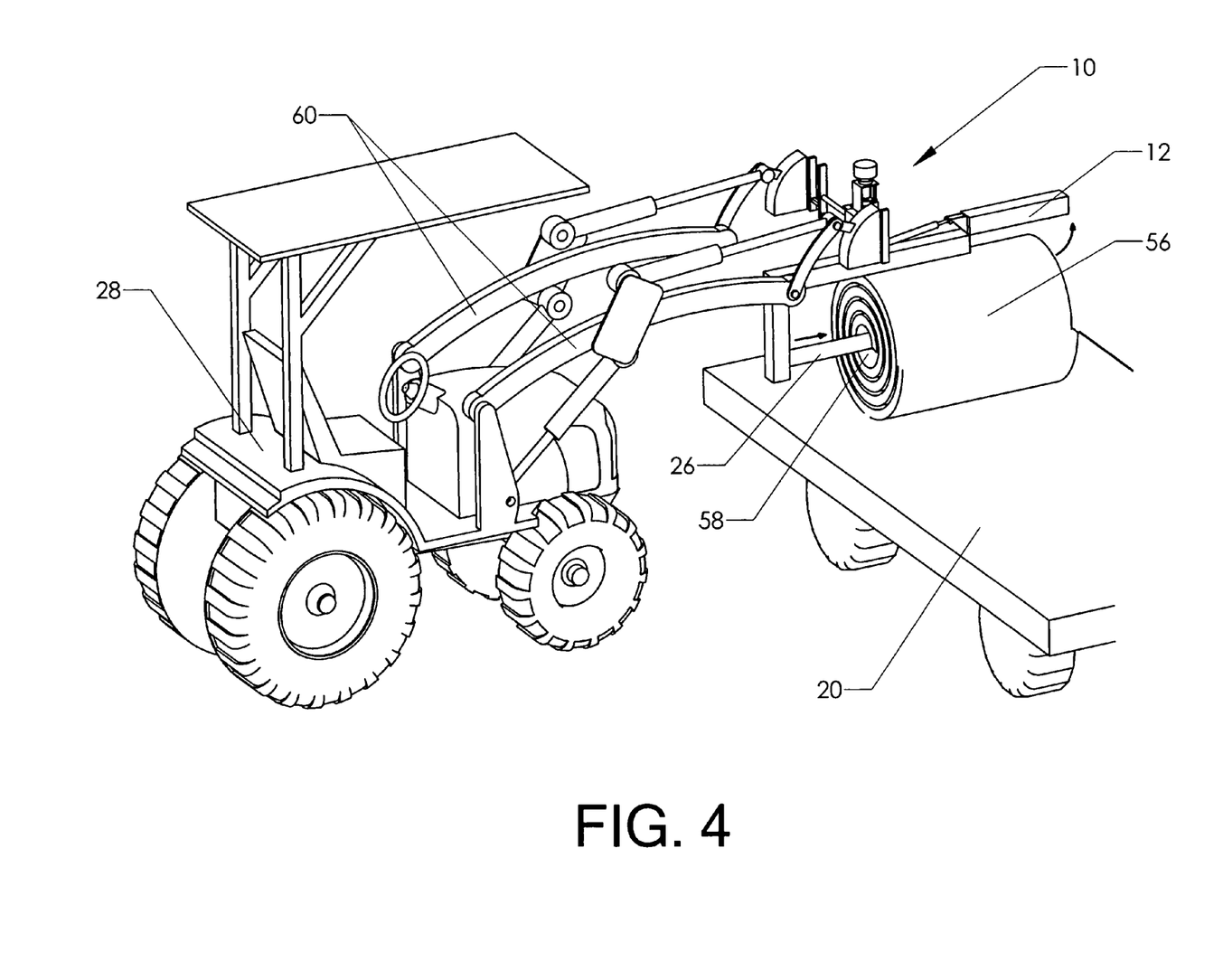
FIG. 4 is a perspective view, showing the present invention attached to a vehicle, loading a roll of sod.

In FIG. 4 a transport vehicle 20 is shown loaded with a roll of sod 56. While a roll of sod 56 is shown the sod roll dispenser 10 could be used to move any object with a central void 58, such as a round bale of hay. The sod roll dispenser 10 can be shifted vertically, horizontally and angularly to enter the central void 58 of the roll of sod 56. As shown, end gate 12 is open to accept roll of sod 56. Base member 26 enters central void 58, when properly aligned.

Figure 5:
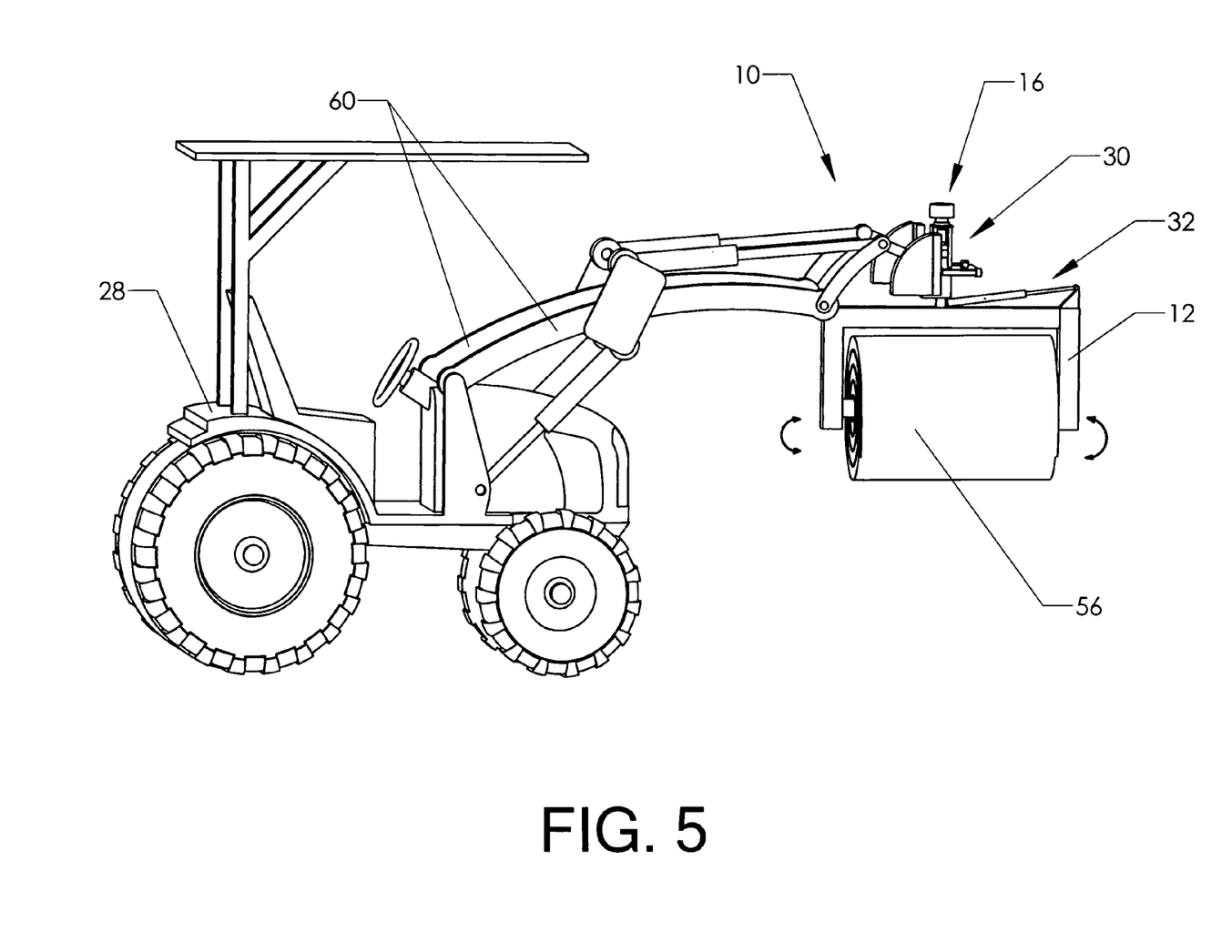
FIG. 5 is a perspective view, showing the present invention attached to a vehicle, picking up and transporting a roll of sod.

End gate 12 shifts and latches into a closed position as shown in FIG. 5, enclosing and securing roll of sod 56. Enclosing roll of sod 56 allows for easy transport without the risk of the roll of sod 56 falling off of sod roll dispenser 10. Roll of sod 56 can be picked up into the air and fully rotated, as shown by the curved arrows. Typically, netting completely surrounds roll of sod 56. The netting prevents the sod roll from unrolling in an untimely manner. By allowing the lifting and securing of the sod roll, the present sod roll dispenser 56 allows a single individual to easily and quickly cut the net and completely remove the net from roll of sod 56.

Figure 6:
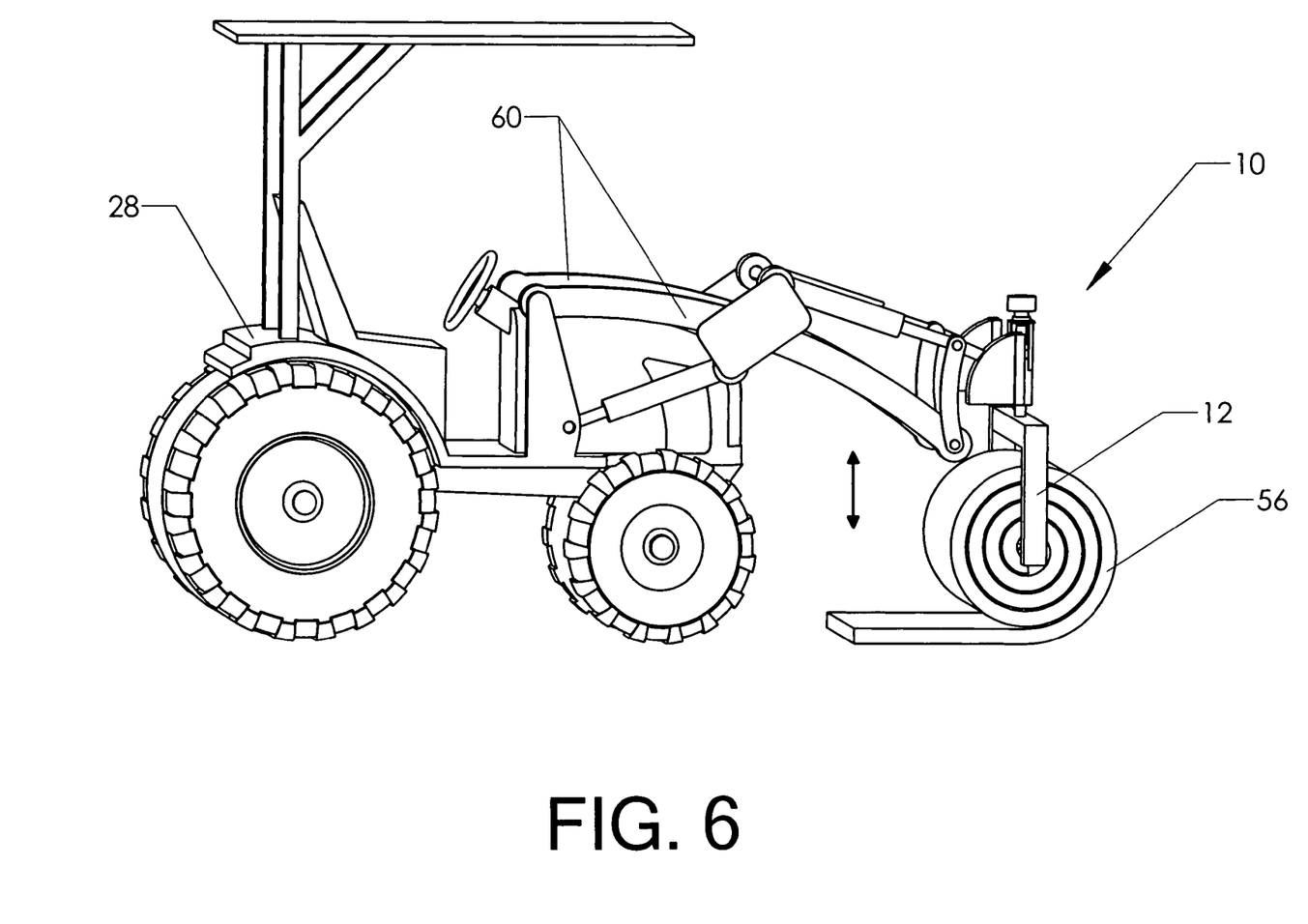
FIG. 6 is a perspective view, showing the present invention unrolling a roll of sod.

When the user has roll of sod 56 in the desired position the user can lower roll of sod 56 onto the ground, as illustrated in FIG. 6, by lowering arms 60 of vehicle 28. As the user drives vehicle 28 forward, roll of sod 56 slowly releases sod onto the ground, until the sod is fully released from sod roll dispenser 10. If the roll of sod 56 is positioned such that vehicle 28 would be required to drive backwards in order to unroll the sod, the present device 10 can rotate the roll of sod 56 180 degrees in order to unroll the sod in the necessary manner.

Figure 7:
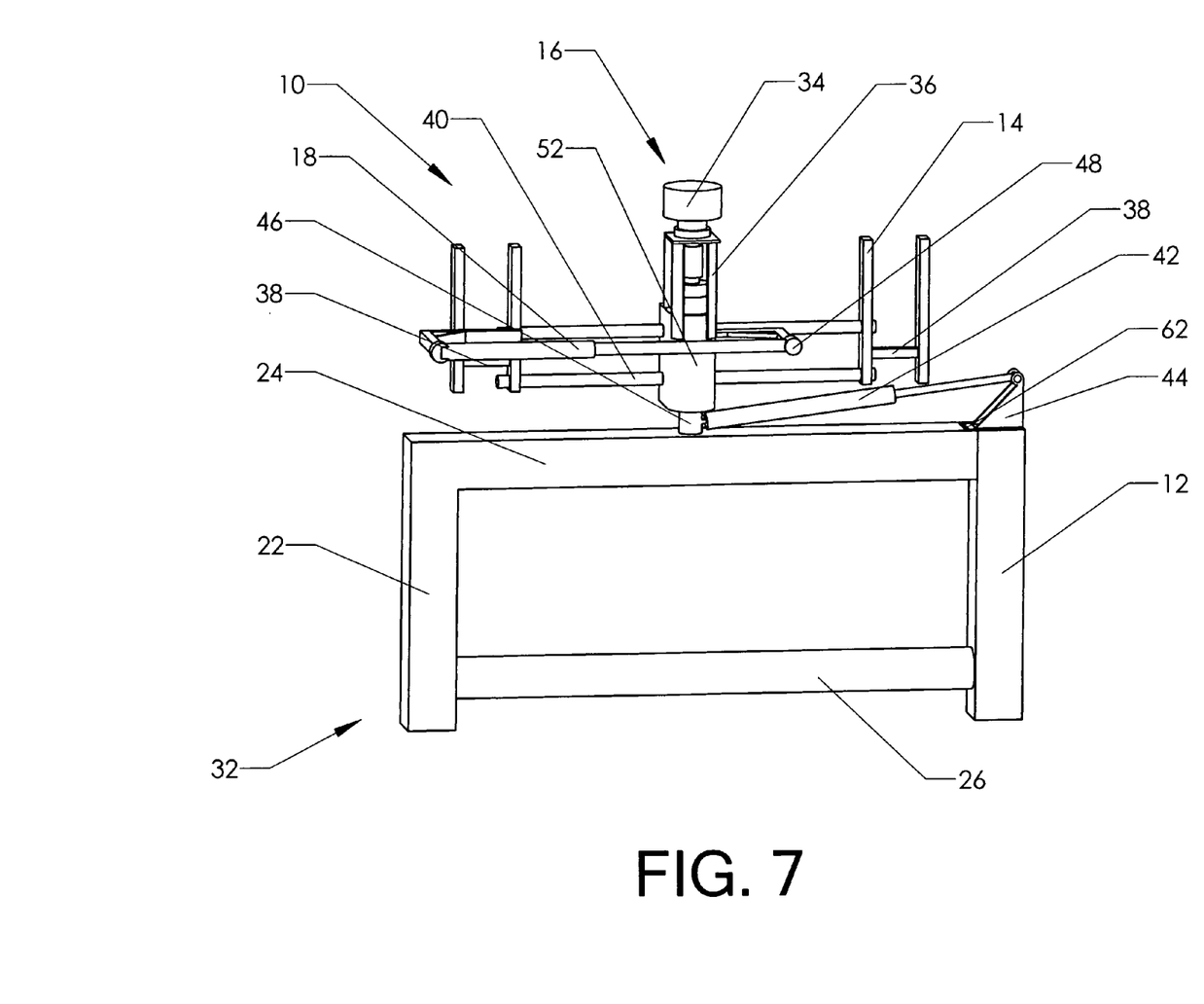
FIG. 7 is a perspective view, showing the present invention.

In FIG. 7 a detailed depiction of the present sod roll dispenser 10 is shown. The sod roll dispenser 10 is generally comprised of top portion 30 (shown and described in FIG. 8), rotary actuator 16 and main frame 32. Sod roll dispenser 10 is shown in a closed position, where end gate 12 is closed against base member 26. Base member 26 preferably is circular, so that a roll of sod may easily slide onto and off of base member 26. Side member 22 is fixedly attached to base member 26 and top member 24.

Figure 8:
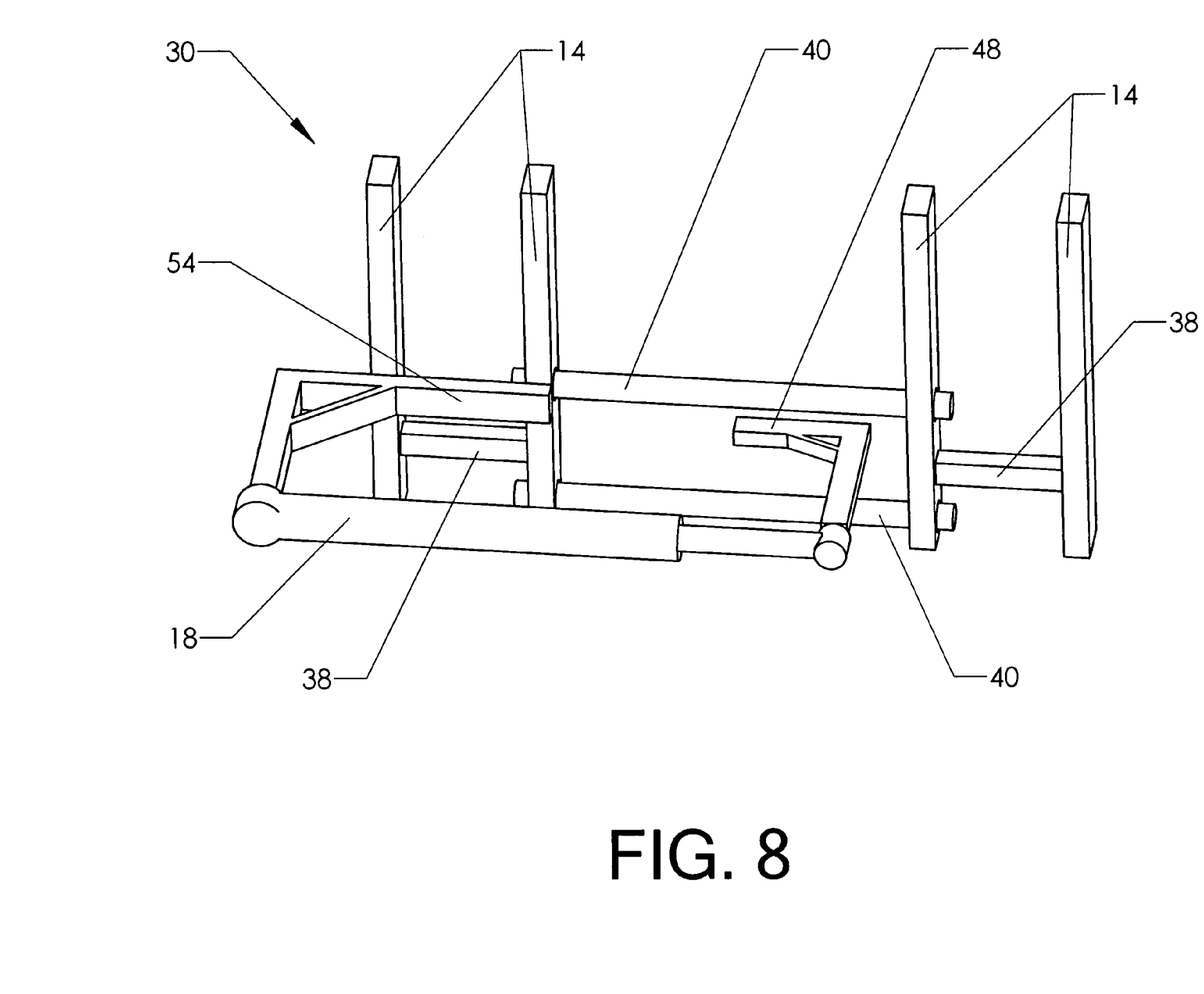
FIG. 8 is a perspective view, showing the top portion of the present invention.

As shown in FIG. 8, top portion 30, is comprised of attachment members 14, rails 40 and side shift actuator 18. Attachment members 14 can be any means of attaching the sod roll dispenser 10 to a prior art vehicle, such as a skid steer, tractor or fork lift. In the preferred embodiment four attachment members 14 are shown connected together by rails 40 and outer connectors 38. However, rails 40 could extend through and connect four attachment members 14. There are preferably two sets of attachment members 14 which are each connected by an outer connector 38. While one outer connector 38 is shown connecting both pairs of attachment members 14, the reader can appreciate that any number of outer connectors 38 could be used to increase stability. The two pairs of attachment members 14 are connected to one another by two rails 40.

Figure 9:
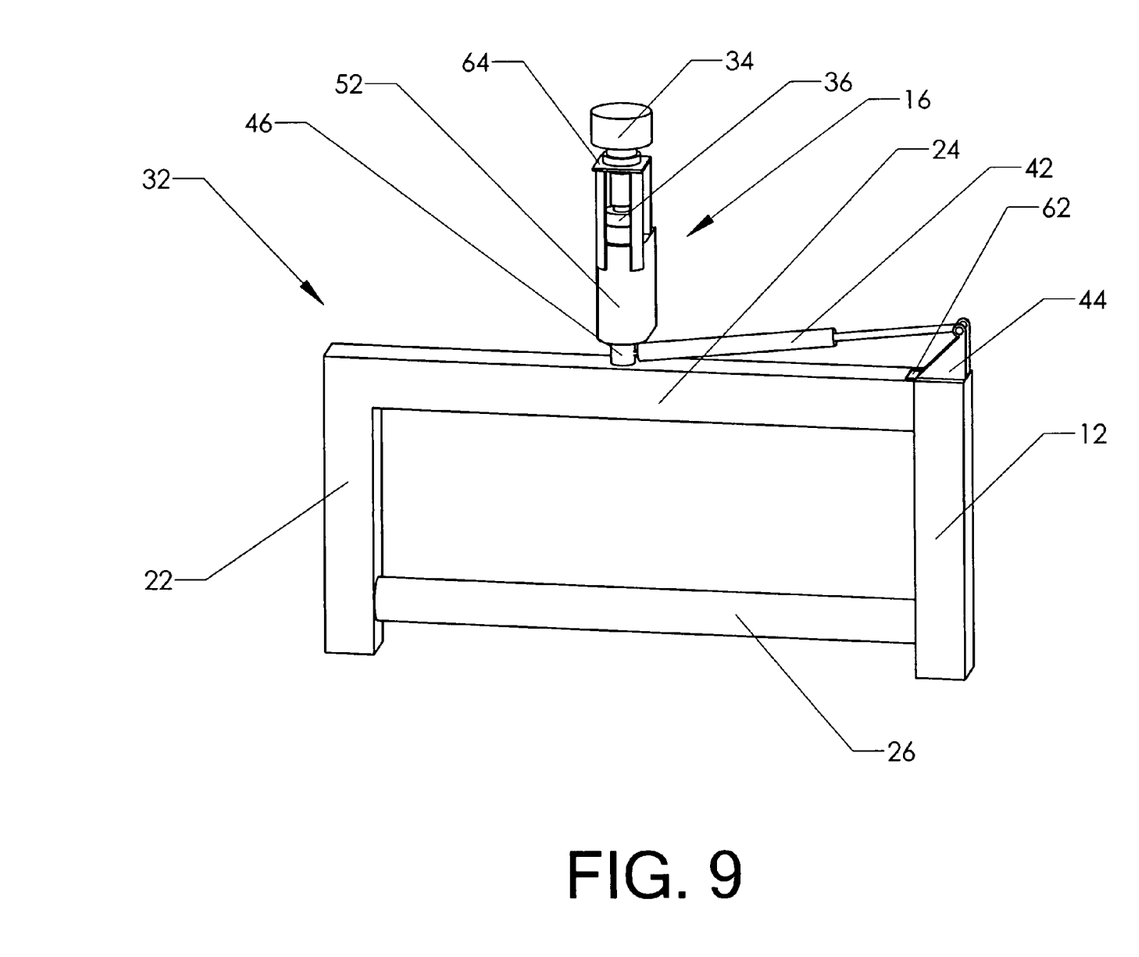
FIG. 9 is a perspective view, showing the rotary actuator and the main frame of the present invention.

As illustrated in FIG. 9, main frame 32 is comprised of top member 24, side member 22, base member 26 and end gate 12. Rotary actuator 16 is comprised of a motor portion 34, bearings 36, central hub 52 and shaft 46.

Top member 24 is attached to rotary actuator 16 by a rotating shaft 46. End gate actuator 42 is attached to shaft 46 and rotates with shaft 46. End gate actuator 42 closes end gate 12 when it extends, in order to secure a sod roll. While end gate actuator 42 could be any means of actuating end gate 12, a hydraulic cylinder is preferably used as end gate actuator 42. End gate 12 pivots about hinge 62.

Rotary actuator 16 can be any type of rotary actuator, such as an electric gear motor. However, in the preferred embodiment a hydraulic motor is used, which converts hydraulic pressure and flow into torque and angular displacement. Additionally, while hydraulic lines are not shown in the illustrations herein, one skilled in the art would recognize that in order to power and control a hydraulically powered sod roll dispenser 10, hydraulic lines would be necessary.

Figure 10:
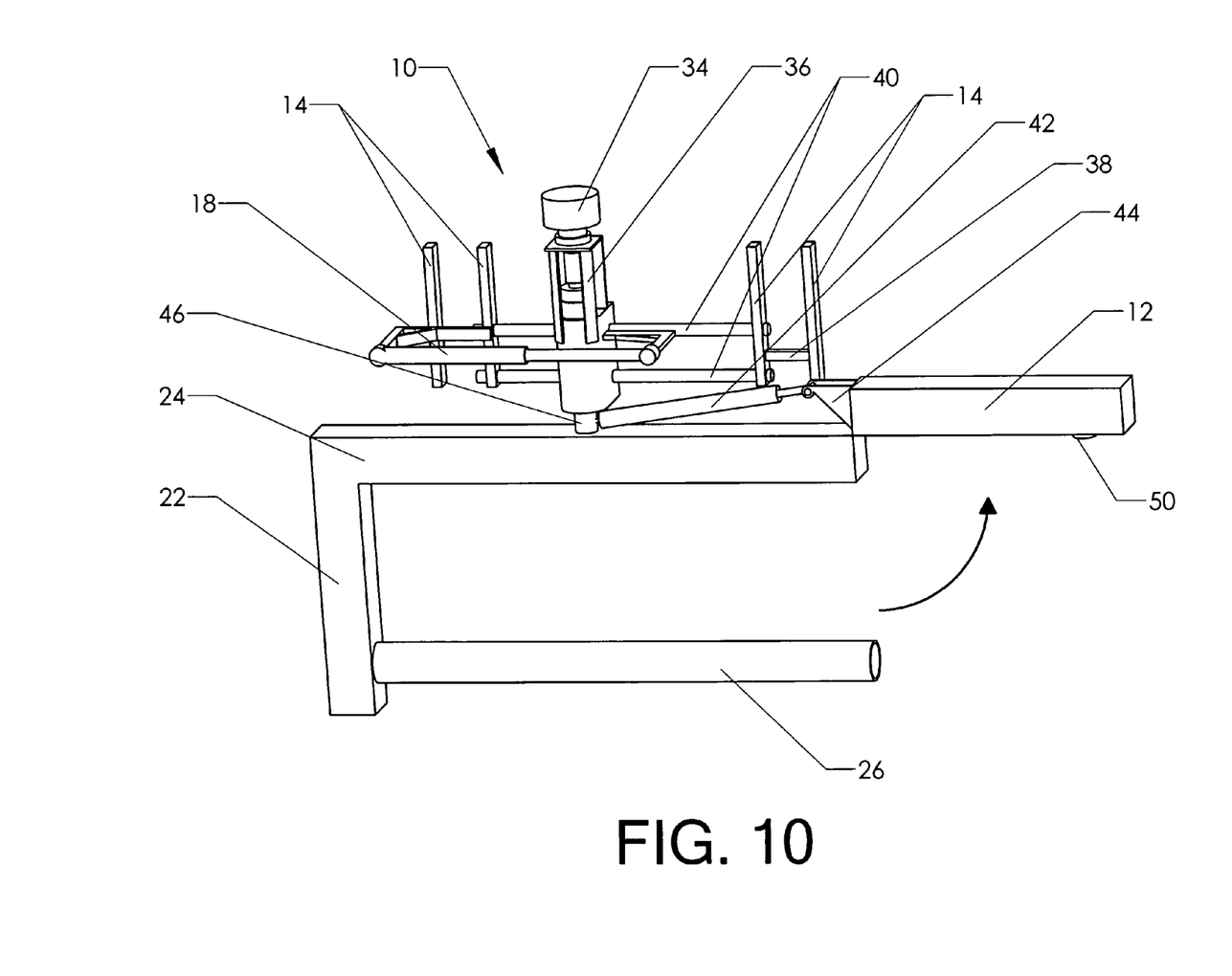
FIG. 10 is a perspective view, showing the present invention with the end gate open.

As illustrated in FIG. 10, when end gate actuator 42 retracts, end gate latch 44 pivots upward and end gate 12 is pulled open. It is in this position that optional fastener 50 is visible. Fastener 50 can be any means of connecting with base member 26. In the preferred embodiment fastener 50 is a circular tab that fits into the hollow end of base member 26 to ensure that main frame 32 is properly closed.

Figure 11:
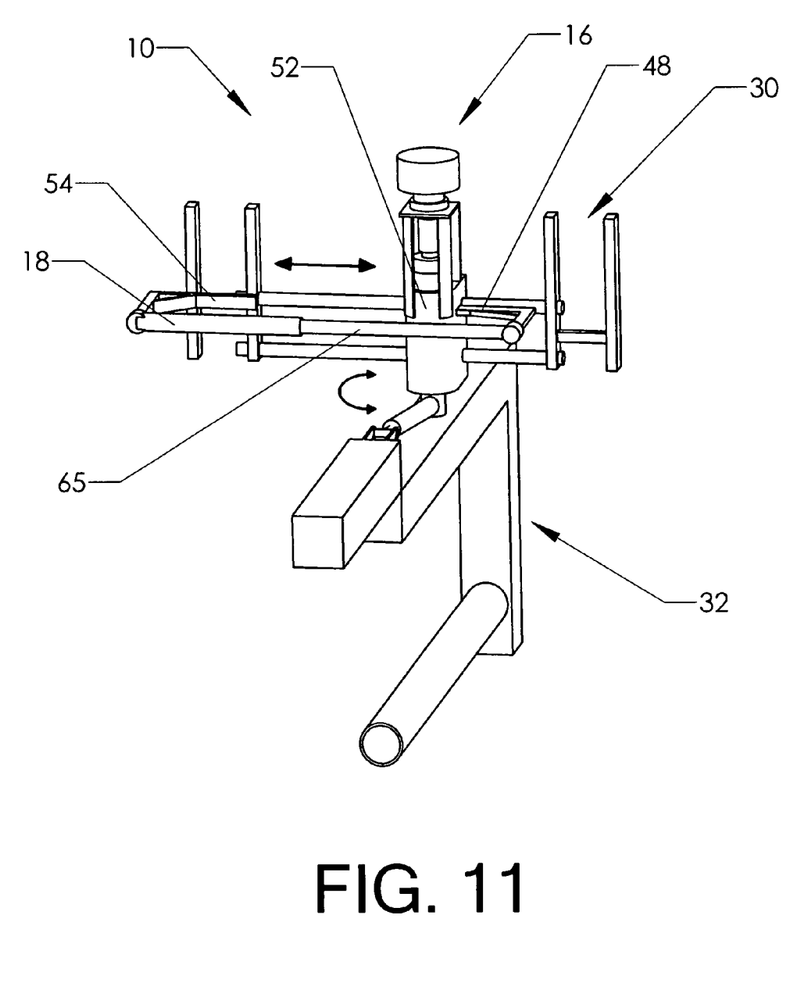
FIG. 11 is a perspective view, showing the present invention shifted to one side.

FIG. 11 illustrates the lateral shifting ability of sod roll dispenser 10. Side shift actuator 18 operates by extending and retracting. Side shift actuator 18 is preferably a hydraulic cylinder. At a first end, side shift actuator 18 is attached to one pair of attachment members 14 by a first connector 54, which remains fixed when arm 65 of side shift actuator 18 extends and retracts. At a second end side shift actuator 18 is attached to central hub 52 of rotary actuator 16 by a second connector 48. When side shift actuator 18 extends or retracts, second connector 48 moves along with arm 65 of side shift actuator 18. As second connector 48 shifts, rotary actuator 16 along with main frame 32 shifts. As rotary actuator 16 and main frame 32 shift, central hub 52 of rotary actuator 16 slides along rails 40, which travel through the back of central hub 52, thereby connecting top portion 30 to rotary actuator 16. The side shifting operation allows the user to better position base member 26 towards the center of a roll of sod prior to loading. Additionally, when sod roller dispenser 10 is loaded with a roll of sod 56 (not shown) the shifting function allows the user to shift main frame 32 and therefore roll of sod 56 (not shown), such that the sod can be unrolled onto the ground in the desired position.

Figure 12:
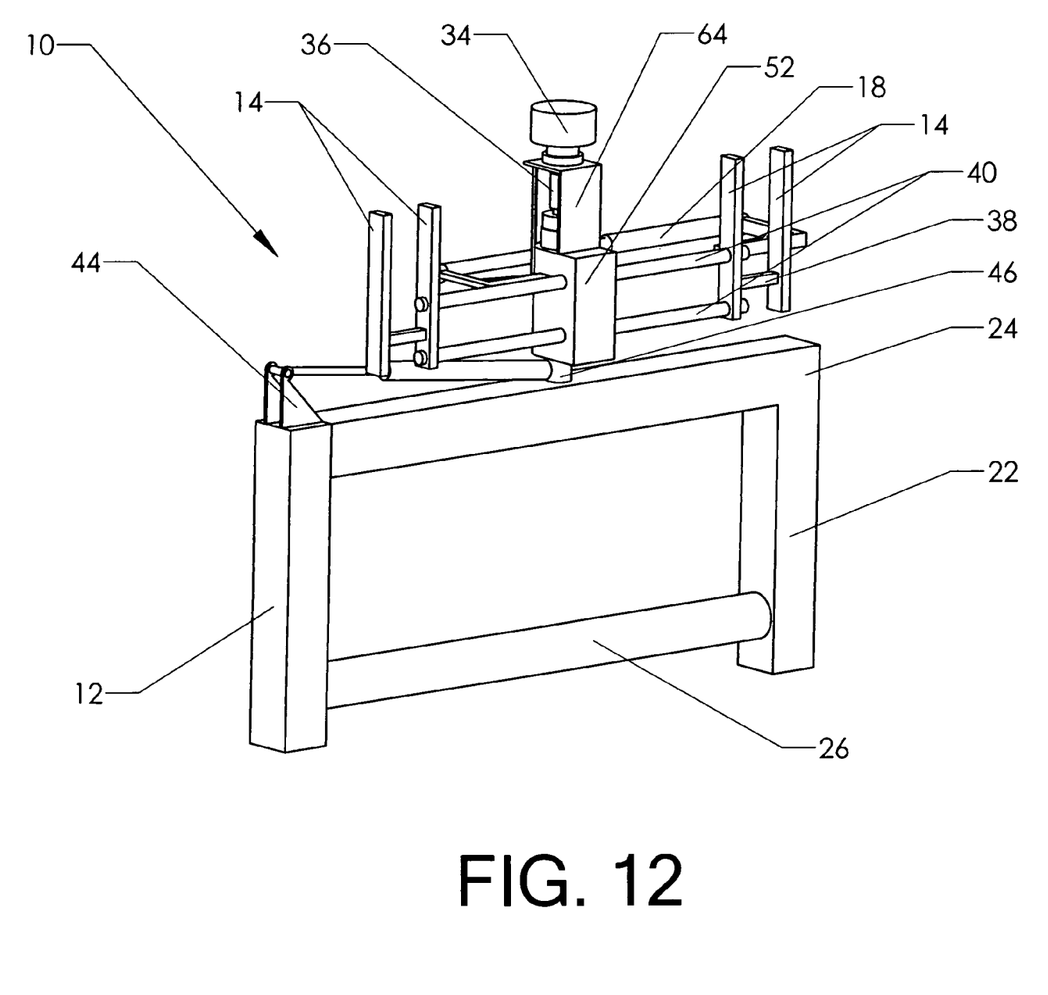
FIG. 12 is a perspective view, showing a view from the back of the present invention.
Figure 13:
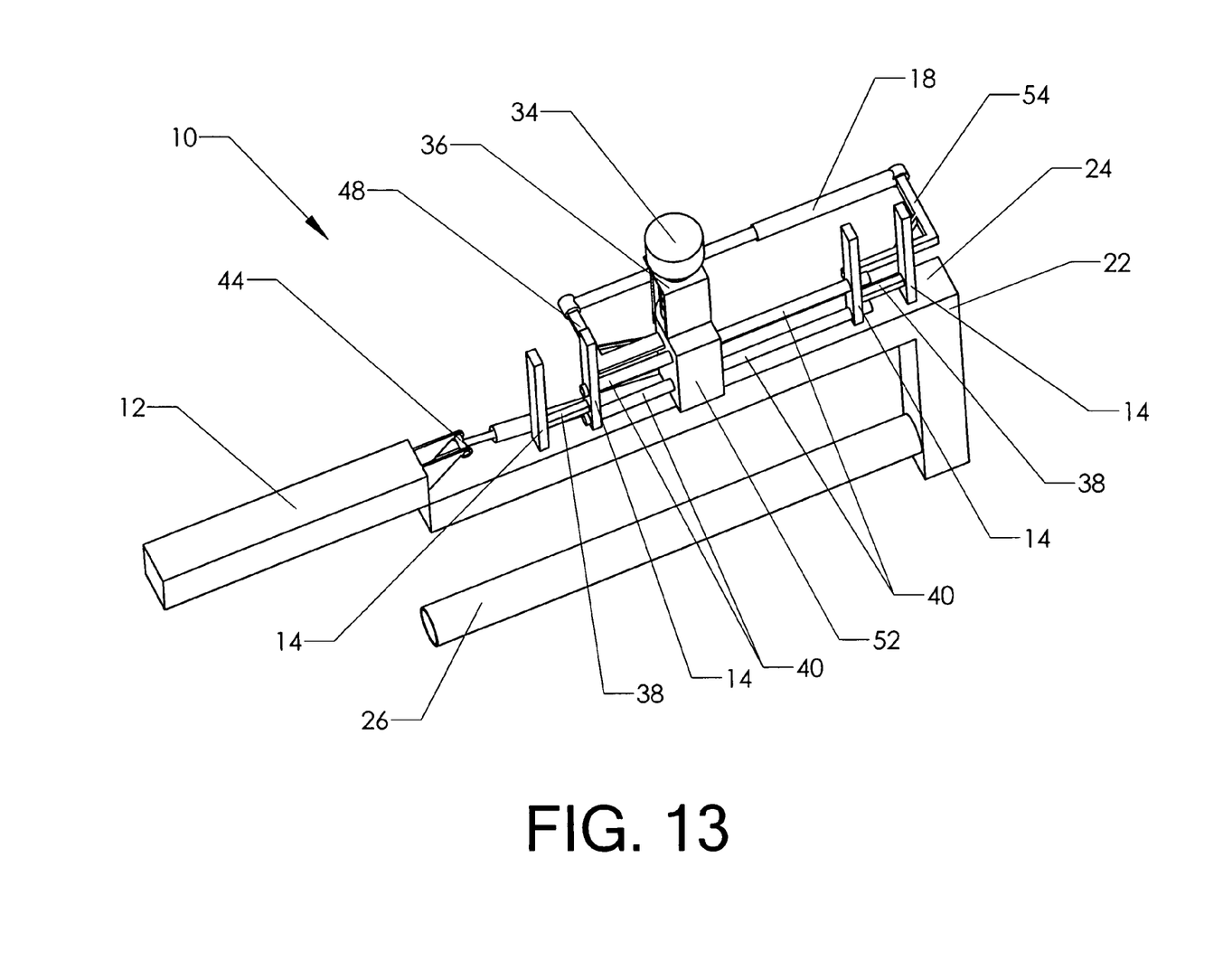
FIG. 13 is a perspective view, showing a top view of the present invention.

FIG. 12 shows a back view of the sod roll dispenser 10. As illustrated rails 40 preferably pass through central hub 52 of rotary actuator 16 which extends slightly out from the back of bearing housing 64 of rotary actuator 16. Additionally, FIG. 13 shows a top view of the sod roll dispenser 10 which also shows the extension of central hub 52 from bearing housing 64 of rotary actuator 16.

The preceding description contains significant detail regarding the novel aspects of the present invention. It should not be construed, however, as limiting the scope of the invention but rather as providing illustrations of the preferred embodiments of the invention. As an example, main frame 32 could be a U shape with a latch door rather than a rectangular shape. Additionally, attachment members 14 can consist of more or less than four members. Thus, the scope of the invention should be fixed by the following claims, rather than by the examples given.

Having described my invention, I claim:

1. A roller for attachment to a vehicle, said roller moving rolls of sod, said roller comprising:
   a. a top portion including:
      i. at least one attachment member;
      ii. wherein said top portion is removably attached to said vehicle;
      iii. a side shift actuator having a first end and a second end;
      iv. wherein said first end is attached to said attachment member;
      v. wherein said second end is an arm which is able to extend and retract; and
      vi. wherein said arm is attached to said rotary actuator;
   b. a rotary actuator attached to said top portion at said central hub such that said rotary actuator can shift laterally along said top portion;
   c. wherein said rotary actuator has a shaft;

d. a main frame attached to said shaft of said rotary actuator;
e. wherein said main frame has an open position and a closed position;
f. wherein said main frame is capable of a series of movements at a central hub, further comprising:
  i. a rotating motion about said central hub with said shaft; and
  ii. a lateral shifting motion along said top portion at said central hub.

2. The roller as recited in claim 1, wherein said side shift actuator is a hydraulic cylinder.

3. The roller as recited in claim 1, wherein said side shift actuator is configured to shift said main frame and said rotary actuator from side to side.

4. The roller as recited in claim 1, wherein said top portion further comprises:
  a. a first pair of attachment means;
  b. a second pair of attachment means;
  c. wherein said first pair of attachment means are connected together by at least one outer connector;
  d. wherein said second pair of attachment means are connected together by at least one outer connector; and
  e. wherein said first pair of attachment means and said second pair of attachment means are connected to each other by at least two rails.

5. The roller as recited in claim 4, wherein said at least two rails are attached to said rotary actuator at said central hub such that said central hub can slide back and forth along said at least two rails, achieving said lateral shifting motion.

6. The roller as recited in claim 5, wherein said end gate further comprises a fastener, such that said fastener couples with said base member of said main frame when in a closed position.

7. A roller for attachment to a vehicle, said roller configured to move rolls of sod, said roller comprising:
  a. a top portion including:
    i. at least two attachment members;
    ii. at least one rail;
    iii. a side shift actuator having a first end and a second end;
    iv. wherein said top portion is removably attached to said vehicle;
  b. a rotary actuator attached to said at least one rail at a central hub such that said rotary actuator can shift laterally along said at least one rail;
  c. a main frame attached to said central hub, wherein said main frame has an end gate;
  d. wherein said main frame is attached to said rotary actuator such that said main frame can rotate;
  e. wherein said main frame is capable of a series of simultaneous movements about said central hub, further comprising:
    i. a rotating motion in which said main frame can complete a turn on said axis of said rotary actuator; and
    ii. a lateral shifting motion wherein said central hub shifts laterally along said at least one rail.

8. A roller as recited in claim 7, wherein said first end of said side shift actuator is attached to at least one of said at least two attachment members; and wherein said second end of said side shift actuator is attached to said rotary actuator.

9. The roller as recited in claim 8, wherein when said side shift actuator expands or contracts said rotary actuator slides along said at least one rail to achieve a horizontal shift.

10. A roller as recited in claim 9, wherein said main frame is further comprised of:
  a. a top member attached to said rotary actuator;
  b. a side member attached to said top member;
  c. a base member attached to said side member; and
  d. a end gate pivotally attached to said top member.

11. The roller as recited in claim 8, wherein said base member is cylindrical.

12. The roller as recited in claim 9, wherein said end gate pivots open or closed at top member by way of an end gate actuator.

13. A roller as recited in claim 10, further comprising:
  a. a shaft attached to said rotary actuator;
  b. wherein said end gate actuator is connected to said shaft;
  c. wherein said top member of said main frame is attached to said shaft; and
  d. wherein when said shaft rotates said end gate actuator and said main frame rotate in the same manner.

* * * * *